United States Patent
Talon et al.

(10) Patent No.: US 10,508,948 B2
(45) Date of Patent: Dec. 17, 2019

(54) TURBINE ENGINE ASSEMBLY FOR MEASURING THE VIBRATIONS TO WHICH A ROTATING BLADE IS SUBJECTED

(71) Applicant: SAFRAN HELICOPTER ENGINES, Bordes (FR)

(72) Inventors: Arnaud Talon, Espoey (FR); Jean-Yves Cazaux, Artiguelouve (FR); Guillaume Chauvin, Gan (FR); Julien Garnier, Jurancon (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 702 days.

(21) Appl. No.: 15/107,612

(22) PCT Filed: Dec. 22, 2014

(86) PCT No.: PCT/FR2014/053510
§ 371 (c)(1),
(2) Date: Sep. 28, 2016

(87) PCT Pub. No.: WO2015/097396
PCT Pub. Date: Jul. 2, 2015

(65) Prior Publication Data
US 2017/0131138 A1    May 11, 2017

(30) Foreign Application Priority Data
Dec. 23, 2013 (FR) ...................................... 13 63470

(51) Int. Cl.
*G01H 1/00* (2006.01)
*G01P 3/487* (2006.01)
(Continued)

(52) U.S. Cl.
CPC ............... *G01H 1/006* (2013.01); *F01D 5/02* (2013.01); *F01D 9/02* (2013.01); *F01D 21/003* (2013.01);
(Continued)

(58) Field of Classification Search
CPC .......... G01H 1/006; G01H 11/02; G01B 7/14; F01D 5/02; F01D 9/02; F01D 21/003; F01D 25/24
See application file for complete search history.

(56) References Cited

U.S. PATENT DOCUMENTS 3,208,269 A * 9/1965 Eccles ..................... F16C 33/34
310/156.08
4,757,717 A * 7/1988 Wolfinger .............. G01H 1/003
324/207.25
(Continued)

FOREIGN PATENT DOCUMENTS

FR    2 956 206 A1    8/2011
GB    1 204 627 A     9/1970

OTHER PUBLICATIONS

International Search Report dated May 8, 2015 in PCT/FR214/053510 filed on Dec. 22, 2014.
(Continued)

*Primary Examiner* — Harshad R Patel
*Assistant Examiner* — Nigel H Plumb
(74) *Attorney, Agent, or Firm* — Oblon, McClelland, Maier & Neustadt, L.L.P.

(57) ABSTRACT

A turbine engine assembly includes a housing and a bladed wheel rotatable within the housing. The bladed wheel includes a blade including a head opposite the housing. The head includes a magnet and the housing includes first and second electrical conductors. Each electrical conductor generates, across terminals thereof, an electrical voltage induced
(Continued)

by the magnet of the head opposite the housing and that represents vibrations of the head of the blade when the bladed wheel is rotated. The first electrical conductor includes a first central portion extending around the rotational axis of the bladed wheel and includes two mutually facing ends, and the second electrical conductor includes a second central portion passing through a space left by the first central portion between the two ends thereof. The arrangement of the electrical conductors makes it possible to obtain two voltages for determining an axial vibration speed at the tip.

11 Claims, 4 Drawing Sheets

(51) Int. Cl.
| | | |
|---|---|---|
| | *F01D 5/02* | (2006.01) |
| | *F01D 9/02* | (2006.01) |
| | *F01D 21/00* | (2006.01) |
| | *F01D 25/24* | (2006.01) |

(52) U.S. Cl.
CPC .............. *F01D 25/24* (2013.01); *G01P 3/487* (2013.01); *F05D 2220/30* (2013.01); *F05D 2240/125* (2013.01)

(56) References Cited

U.S. PATENT DOCUMENTS

| | | | |
|---|---|---|---|
| 5,450,760 A * | 9/1995 | Lew ........................ | G01F 1/106 73/861.02 |
| 8,125,215 B2 * | 2/2012 | Rokicki .................. | G01H 1/006 324/207.15 |
| 2010/0045273 A1 | 2/2010 | Rokicki et al. | |
| 2010/0150730 A1 * | 6/2010 | Sellars ................... | F01D 11/122 416/241 R |
| 2013/0247671 A1 * | 9/2013 | Nakayama ................ | F01D 5/16 73/579 |
| 2016/0320230 A1 * | 11/2016 | Talon ..................... | G01H 1/006 |

OTHER PUBLICATIONS

Preliminary Search Report and Written Opinion dated Sep. 26, 2014 in French Patent Application No. 1363470 (with English translation of Categories of Cited Documents).
International Search Report dated May 8, 2015 in PCT/FR2014/053510 (with English translation of Categories of Cited Documents).

* cited by examiner

TURBINE ENGINE ASSEMBLY FOR MEASURING THE VIBRATIONS TO WHICH A ROTATING BLADE IS SUBJECTED

GENERAL FIELD

The invention relates to the field of rotatably movable blades.

The invention relates more particularly to the field of characterization of vibrations which such blades sustain when set in rotation.

PRIOR ART

An impeller is a hub comprising a plurality of blades, or vanes. During design and certification of turbine engines, it is necessary to verify whether such a rotatably movable impeller in a casing has suitable frequencies likely to be excited in the field of operation of the motor of such turbine engines.

It is also necessary to quantify the levels of associated vibratory restrictions for suitable modes identified in this field of operation.

A first known technique for characterizing vibrations sustained by blades in operation consists of the use of deformation gauges stuck to the impeller. It is possible to characterize the blades in the frequency domain and calculate the constraints within the material from measuring micro-deformations at the surface of the material.

However, this first technique comprises many disadvantages.

First, the gauges stuck to the vanes are subjected to huge centrifugal forces (of the order of 100,000 g) potentially associated with very high temperatures, especially when the instrumentation is done on a high-pressure turbine. The shelf life of gauges is consequently limited.

Second, placing the gauge requires substantial knowhow, minutiae and time (especially for the firing of cements in which the gauges are set).

Third, it is necessary to have the signal coming from the gauges embedded in the movable impeller transit to a fixed marker. For this, connecting wires on the motor shaft must lead to a turning collector. Apart from the length of the wires and the turning connection of the collector, generating noise measurements, preliminary studies for integration of a turning collector on a motor are long and costly.

A second technique based on the use of optical probes positioned facing the rotating vanes, and therefore in a fixed marker, has been proposed to eliminate these disadvantages.

This second technique makes a measurement of the time passage spreads before the optical probes for two vibratory states of a vane (in the presence or not of vibrations). Such a measuring method, called "tip timing", recalculates amplitudes of alternated shifts at the vane tip. The knowledge of mode shapes puts the levels of shift at the tip of vane in relation to the levels of constraints in the vane.

This second technique however does not produce frequency information on the vibrations measured. Only overall levels of shifts at the vane tip are in fact identifiable by this second technique without knowing which vane mode is excited. For vibratory monitoring purposes, this limitation can be widely penalizing.

Also, the "tip timing" process sometimes has ambiguities disallowing identification of the order of excitation responsible for the levels of recorded shifts.

PRESENTATION OF THE INVENTION

The invention therefore aims to allow characterization of vibrations sustained by a vane when set in rotation, especially to quantify vibration speeds sustained by the vane.

To this end and according to a first aspect, an assembly for turbine engine is proposed, the assembly comprising a casing and an impeller rotatably movable in the casing, the impeller including at least one vane having a tip facing the casing, the assembly being characterized in that the tip includes a magnet and in that the casing includes a first and a second electrical conductors, each electrical conductor being adapted to generate between its terminals an electrical voltage induced by the magnet of the facing tip representative of vibrations sustained by the tip of the vane when the impeller is set in rotation, the first electrical conductor comprising a first central part extending around the axis of rotation of the impeller and including two facing ends, and the second electrical conductor comprising a second central part passing through a space left by the first central part between its two ends.

According to a second aspect, a method of measuring vibrations of a vane of an assembly for turbine engine according to the first aspect is proposed, comprising the steps of:

setting in rotation of the impeller in the casing,
measuring at the terminals of each of the electrical conductors of a respective electrical voltage induced by the magnet contained in the tip of the vane facing the casing,
determining the speed of the magnet,
calculating an axial vibration speed sustained by the tip of the vane based on the two measured electrical voltages and the determined speed of the magnet.

The magnet generates a magnetic field. When the rotatably movable impeller is set in rotation relative to the casing, this magnetic field induces electric current in each of the electrical conductors in the casing, which is located facing the tip of the vane which holds the magnet. Each electric current spreads as far as the terminals of the corresponding electrical conductor, causing an electrical voltage to appear at these terminals. The electrical voltage at the terminals of each electrical conductor makes it possible to characterize the vibrations sustained by the vane. Moreover, the mutual arrangement of the two electrical conductors in the proposed assembly for a turbine engine makes it possible to obtain two voltages, from which an axial vibration speed at the tip of the vane can be determined.

The proposed assembly for turbine engine thus makes it possible to overcome direct measurements of constraints on the impeller, and avoid heavy instrumentation in the movable marker linked to the vane, to characterize its vibrations. The instrumentation is minimum in this movable marker (just one magnet is integrated into the vane) and also minimum in the fixed marker linked to the casing (insertion of two electrical conductors on or in the casing), to quantify axial vibrations of the instrumented vane.

The assembly according to the first aspect can be supplemented by the following features, taken alone or in any one of their technically possible combinations.

The first central part can extend in a path plane of the magnet around the axis of rotation of the impeller, and the second central part can extend orthogonally to the path plane. In such an embodiment, the voltage measured at the terminals of the first electrical conductor is representative of the vibrations of the magnet made outside this path plane, and this voltage is independent of the rotary movement of the vane around its axis of rotation (so, in a perfect situation in which the vane would not be subject to any vibration, the voltage at the terminals of the electrical conductors when the magnet is facing a portion of the central part would be minimized).

The first central part can furthermore form a portion of a circle centered on a point of the axis of rotation of the impeller, and the second central part pass through the path plane in one point of said circle. Such an embodiment is simple to implement in the case where the casing has an internal surface facing the impeller which is cylindrical; moreover, in this embodiment, the magnetic field generated by the magnet then has an influence on respective portions of the central parts of the electrical conductors which have the same lengths.

In addition, the magnet can be adapted to emit a magnetic field along a radial axis with respect to the axis of rotation of the impeller, the magnetic field generated being isotropic around the radial axis. With such an arrangement of the magnetic field, the axial vibration speed of the vane becomes proportional to the ratio of the voltages measured at the respective terminals of the two electrical conductors.

The voltages at the terminals of the two electrical conductors are generally low. Also, a voltage amplifier can be connected to the terminals of the electrical conductor, with measurements being made at the output of this amplifier.

The two electrical conductors can also be embedded at least partially in an abradable deposit located on an internal surface of the casing facing the impeller, the abradable deposit being made of paramagnetic or diamagnetic material. In this way, the magnetic flow of the magnet is barely modified, and the entire magnetic flow generated by the magnet can be exploited in the measurements taken.

DESCRIPTION OF FIGURES

Other characteristics, aims and advantages of the invention will emerge from the following description which is purely illustrative and non-limiting and which must be considered with respect to the appended drawings, in which:

FIG. 2b details a portion of the assembly illustrated in FIG. 2a.

In all figures similar elements bear identical reference numerals.

DETAILED DESCRIPTION OF THE INVENTION

Figure 1:
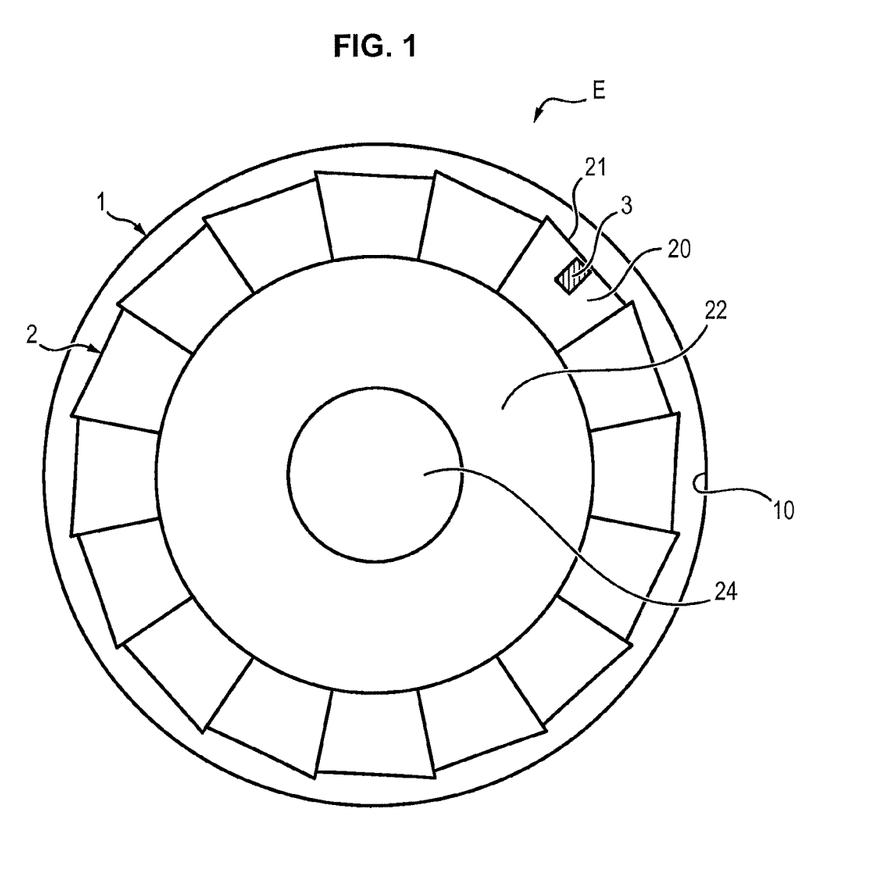
FIG. 1 is a view in partial section of an assembly for turbine engine according to an embodiment of the invention.

In reference to FIG. 1, an assembly E for turbine engine comprises a casing 1 and an impeller 2 rotatably movable relative to the casing 1.

The casing 1 has an internal surface 10 defining a space which houses the impeller 2. This internal surface 10 is for example cylindrical.

The impeller 2 is mounted on a motor shaft 24 extending along an axis of rotation (perpendicular to the plane of FIG. 1). The impeller 2 comprises a disc 22 around the shaft 24, and a plurality of vanes. Each vane extends substantially radially from the disc 22 until it terminates by a respective tip. In this way, the tip of each vane is facing a surface portion of the casing 1, irrespective of the angular position occupied by the impeller 2 movable relative to the casing 1.

At least one of the vanes of the impeller, referenced 20, comprises a magnet 3 at its tip 21.

The magnet 3 is integral with the vane 20, in turn integral with the disc 22; it is assumed hereinbelow that the movement of the magnet 3 is representative of the movement of the tip 21 of the vane 20.

The topology of the magnetic field created by the magnet 3 is similar to that of a solenoid with several turns: it forms a torus enclosing the magnet 3 and oriented from its north pole to its south pole. The magnet 3 is adapted to generate a magnetic field of radial orientation relative to the axis of rotation of the impeller 2.

Figure 2A:
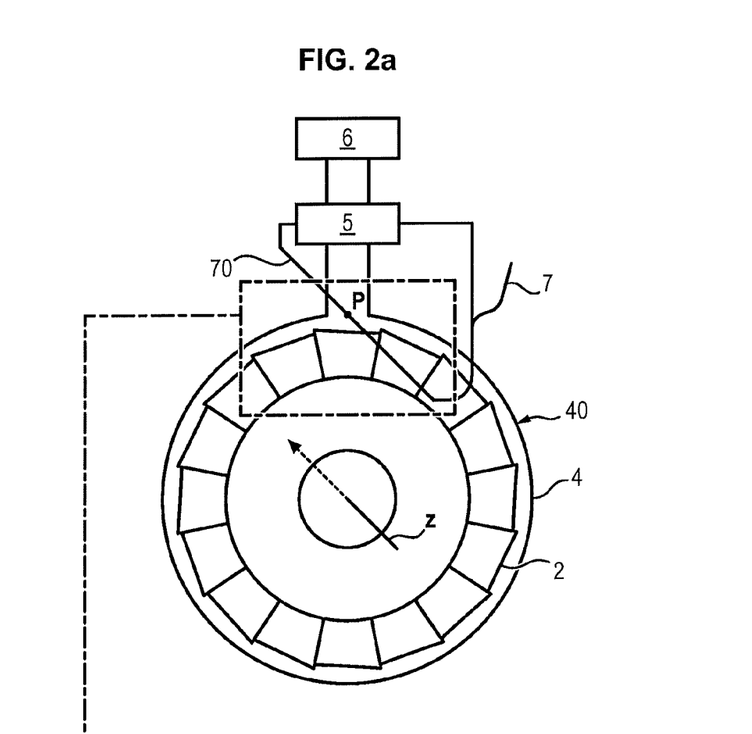
FIG. 2a is a schematic perspective view of the assembly of FIG. 1.

In reference to FIG. 2a, the casing 1 comprises a first electrical conductor 4 and a second electrical conductor 7.

The terminals of each electrical conductor 4, 7 are connected to inputs of an identical or different voltage amplifier 5.

The assembly E also comprises a measurement device 6 at the output of the voltage amplifier(s) 5. This device 6 comprises means for implementing calculations regarding the voltage values measured by this device 6.

Figure 2B:
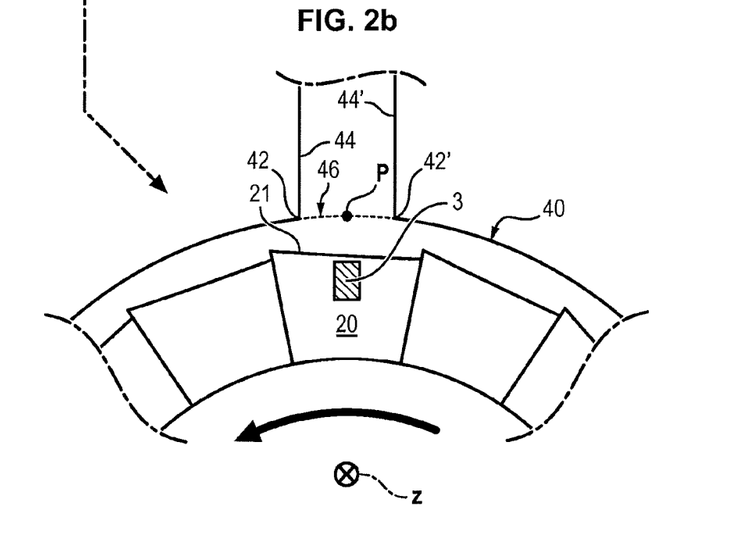

In reference to FIG. 2b, the first electrical conductor 4 comprises a so-called "central" part forming a turn or a portion of turn around the axis of rotation of the impeller 2. This central part 40 is for example fixed to the internal surface 10 of the casing 1 facing the impeller 2.

The central part 40 comprises two ends 42, 42' located at different angular positions around the axis of rotation of the impeller 2.

The electrical conductor 4 also comprises two branches 44, 44' each prolonging a respective end of the central part 40.

The central part 40 preferably does not extend over the entire circumference of the casing 1 around the axis of rotation of the impeller 2, but forms an arc formed by an angular sector of fewer than 360 degrees around the axis of rotation of the impeller. The two ends 42, 42' delimit a portion of circumference of the casing 1 not covered by the central part 40; this non-covered potion is qualified below as "turn opening", referenced 46.

The branches 44, 44' can extend in a direction substantially radial to the outside relative to the axis of rotation of the impeller 2 in the casing 1. At the end 42 (respectively 42') which it prolongs, each branch 44 (respectively 44') forms for example with the central part 40, an angle of between 80 degrees and 100 degrees, preferably 90 degrees.

The central part 40 and the branches 44, 44' which prolong this central part 40 extend in a plane which coincides with a path plane of the magnet 3 (the plane of FIGS. 2a and 2b) during a revolution of the vane 20 around the axis of rotation of the impeller 2.

When the impeller 2 occupies an angular position such that the magnet 3 is facing a point of the central part 40, the relative movement of the magnetic field generated by the magnet 3 relative to the central part 40 when the vane 20 vibrates induces an electric current in the branches 44 and 44'.

The second electrical conductor 7 includes a part 70 also called "central" passing through the turn opening 46 left between the ends 42, 42' of the first electrical conductor 4.

This central part 70 has no electrical contact with the first conductor 4, and can also be attached to the internal surface 10 of the casing 1 facing the impeller 2.

The second electrical conductor 7 passes in particular through a point P of the path plane of the magnet 3, this point P being situated between the two ends 42, 42' facing one another, for example halfway between these ends 42. The point P is located at the same radius as the central part 40 of the conductor 4.

The central part 70 of the second electrical conductor 7 is extended at both of its ends by two branches forming the terminals of the second electrical conductor 7, connected to the amplifier 5.

When the impeller 2 occupies an angular position such that the magnet 3 is located facing the point P of the central part 70, the magnetic field generated by the magnet 3 induces an electrical current in a portion of the central part 70 in the vicinity of this point P.

The central part 70 of the second conductor 7 is preferably rectilinear in the vicinity of this point P, and oriented orthogonally to the plane wherein the first electrical conductor 4 extends; the central part 70 is then parallel to the axis of rotation z of the impeller 2.

In the embodiment illustrated in FIGS. 2a and 2b, the point P and the central part 40 of the first electrical conductor 4 define portions of a same circle; in this way the airgap between the magnet 3 and any point of the central part 40, and the air gap between the magnet 3 and the point P have identical lengths: the magnetic field B generated by the magnet 3 then has a comparable or identical influence on respective portions of the central parts 40, 70 of the electrical conductors 4, 7.

General Principle of a Method of Measuring Vane Vibrations

Figure 3:
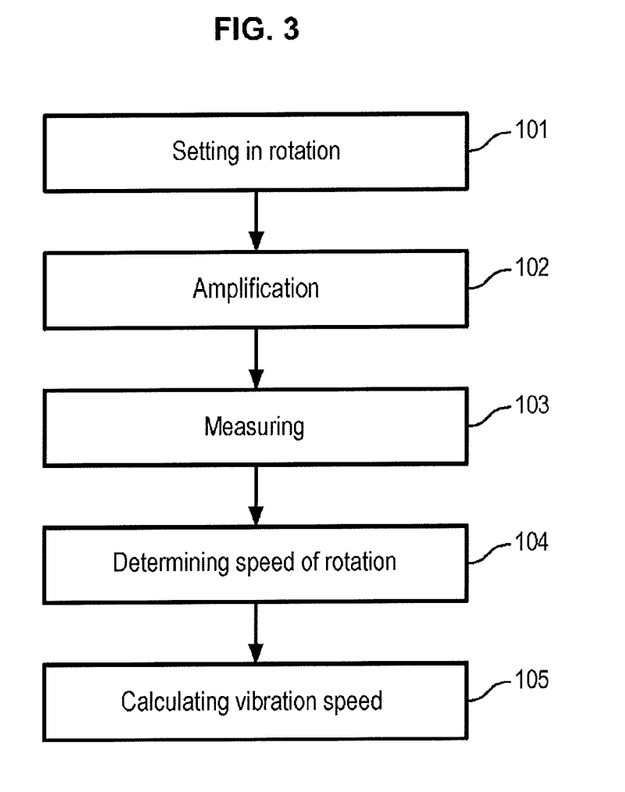
FIG. 3 is a flowchart of steps of a method of measuring vibrations sustained by a vane, according to an embodiment of the invention.

FIG. 3 shows the steps of a method of measuring vibrations sustained by the vane 20 comprising the magnet 3.

In a preliminary step 101, the impeller 2 is set in rotation around its axis of rotation. This setting in rotation is likely to generate vibrations of the vane 20.

One period of revolution of the vane 20 around the axis of rotation of the impeller 2 comprises two different phases, each corresponding to a respective range of angular positions of the impeller 2 movable relative to the casing 1: a phase during which the magnet 3 is facing a portion of the central part 40, and a phase during which the magnet 3 is facing the turn opening 46 left between its two ends 42, 42'.

When the magnet 3 is facing a portion of the central part 40 of the first electrical conductor 4, vibratory movement relative to the magnetic field B generated by the magnet 3 relative to the central part 40, causes a first electric current in the central part 40, which spreads as far as the terminals formed by the branches 44, 44'. Voltage U1 is generated between the two terminals of the first electrical conductor 4.

Similarly, when the magnet 3 is facing the turn opening 46, and therefore is facing the central part 70 of the second electrical conductor 7, the relative vibratory movement of the magnetic field B generated by the magnet 3, with respect to the central part 70, induces a second electrical current in the central part 70 which propagates to the terminals of the second electrical conductor 7. A voltage U2 is then generated between the two terminals of the second electrical conductor 7.

The voltages U1 and U2, generally very small, are amplified by the amplifier 5 during a step 102.

In a step 103, the measuring device 6 acquires the voltages U1 and U2, amplified by the amplifier(s) 5.

In a step 104, the measuring device 6 determines the speed of rotation of the vane 20 based on one and/or the other measured voltage. As will be detailed hereafter, the speed of rotation of the vane 20 is deduced from the duration of a rotation of the magnet around the axis of rotation, this duration being manifested by variations in the measured voltage.

In a step 105, the device 6 calculates an axial vibration speed sustained by the vane tip based on the two measured electrical voltages.

The electromagnetic actions of the magnet 3 during the two aforementioned phases will now be described in more detail.

Electromagnetic Action of the Magnet 3 when it is Facing the Central Part 40

Figure 4:
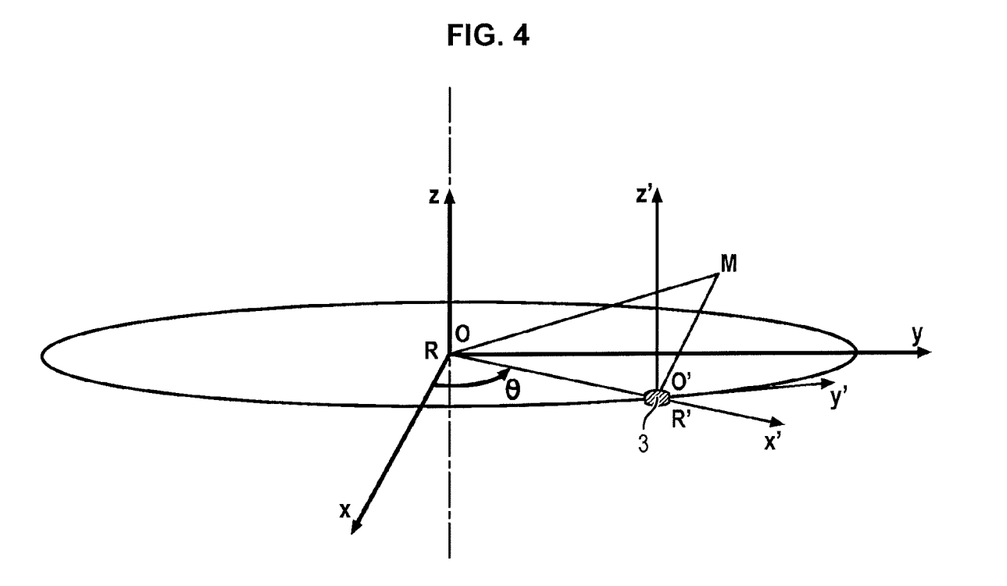
FIG. 4 shows markers associated with different elements of the assembly for turbine engine shown in FIGS. 1 and 2.

In reference to FIG. 4, a fixed frame R is associated with the casing 1, and a movable frame R' is associated with the magnet 3.

The fixed frame R is defined by a center O, the axis of rotation of the impeller 2, referenced z, and axes x and y defining a plane perpendicular to the motor axis and containing the movement of the magnet 3.

The movable frame R' is defined by a center O' representative of the position of the magnet 3, an axis z' parallel to the axis z, an axis x' supported by the straight OO', and an axis such as the marker R' is a direct trihedral. The movable frame R' forms an angle θ relative to the fixed marker R.

In general, the laws of change of frame from R to R' of a point M in the marker R' impose the following relation:

$$\vec{V}_{M/R} = \vec{V}_{O'/R} + \vec{V}_{M/R'}$$

Figure 5:
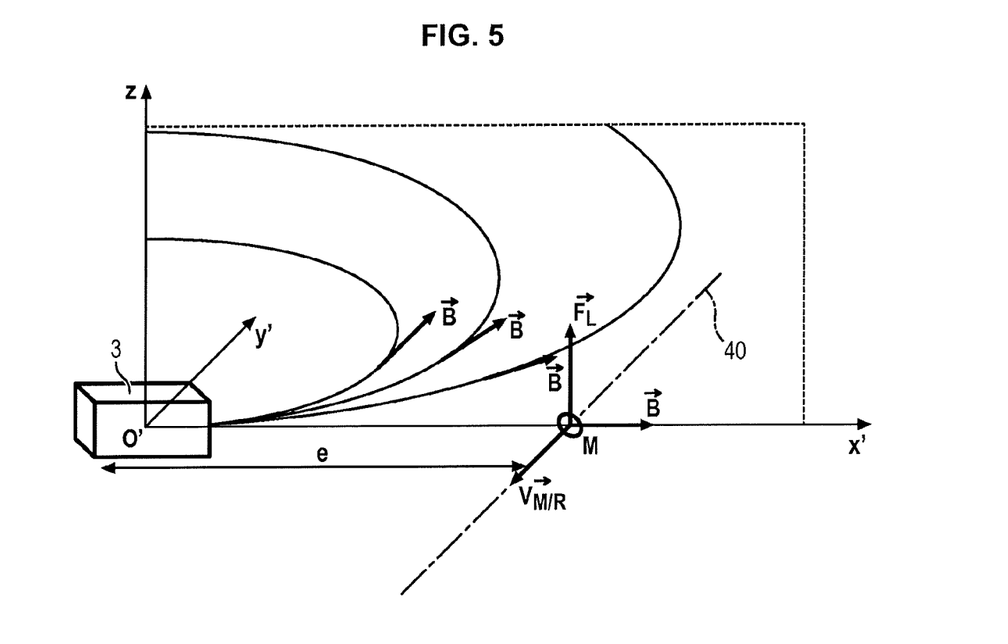
FIG. 5 schematically illustrates electromagnetic interactions between elements of the assembly for turbine engine illustrated in FIGS. 1 and 2.

In reference to FIG. 5, a point of the central part 40 of the first conductor 4 is considered as a point M. This can be shown as:

$$\vec{V}_{O'/R} = -\vec{V}_{M/R'}$$

This relation shows that, equivalently, the magnet 3 at the tip of vane 20 moves relative to the central part 40 fixed in the fixed marker, or that the central part 40 moves relative to the magnet 3 fixed in the movable marker.

Given an electron belonging to the central part 40, immobile in the fixed frame R, its apparent speed in the turning frame R' will be the vector $\vec{V}_{M/R}$, i.e, the speed which a point of the turning marker in the fixed marker at the distance r+e would have, where e designates the airgap between the magnet 3 and the central part 40 and r the distance OO'.

Given that this point M is completely in the axis of the magnet 3 O'X', the resulting of the Lorentz force F1 to be applied to the electron will be oriented as shown in FIG. 5.

The device in the plane O'x'z can be considered and the components of the field B can be considered only on the components x' and z. The speed of advancement of the electron in the turning frame is that which a fixed point in the turning marker at the distance r+e would have, given the radius r of the blade and the airgap e between the magnet 3 and the abscissa in the turning marker of the point M. The electromotor field can be expressed as follows:

$$\vec{E}_M = \vec{v}_{M/R'} \times \vec{B} = \begin{vmatrix} 0 \\ (r+e)\dot{\theta} \\ 0 \end{vmatrix} \times \begin{vmatrix} B_{x'} \\ B_{y'} \\ B_{z'} \end{vmatrix} = \begin{vmatrix} (r+e)\dot{\theta}B_{z'} \\ 0 \\ -(r+e)\dot{\theta}B_{x'} \end{vmatrix} = \begin{vmatrix} E_{x'} \\ E_{y'} \\ E_{z'} \end{vmatrix}$$

When the magnet 3 is subjected to vibrations of the vane 20, the electromotor field generated in this way by the vibratory movement of the vane 20 becomes:

$$\vec{E}_M = \vec{V'} \times \vec{B} = \begin{vmatrix} v_{VIBx} \\ (r+e)\dot{\theta} + v_{VIBy} \\ v_{VIBz} \end{vmatrix} \times$$

$$\begin{vmatrix} B_{x'} \\ B_{y'} \\ B_{z'} \end{vmatrix} = \begin{vmatrix} (r+e)\dot{\theta}B_{z'} + v_{VIBy}B_{z'} - v_{VIBz}B_{y'} \\ v_{VIBz}B_{x'} - v_{VIBx}B_{z'} \\ v_{VIBx}B_{y'} - (r+e)\dot{\theta}B_{x'} - v_{VIBy}B_{x'} \end{vmatrix} = \begin{vmatrix} E_{Mx'} \\ E_{My'} \\ E_{Mz'} \end{vmatrix}$$

where:

$$\vec{V_{M/R'}} + \vec{V_{M/R'}} = \vec{V'}$$

A current induced in the central part 40 is measurable when the electromotor field will be oriented according to the component y, i.e., in the axis of the conductor. A measurable component will therefore be:

$$\vec{E}_{Mutile} = (Vvibz \cdot B_{x'} - Vvibx \cdot B_{z'})\vec{e}_{y}'$$

Besides, if the hypothesis is made that the magnet 3 is contained in the plane of the central part 40, this component is rewritten as:

$$\vec{E}_{Mutile} = (Vvibz \cdot B_{x'})\vec{e}_{y}'$$

As a consequence, in the event where the magnet 3 is in the plane of the central part 40, only vibratory behavior along the axis z (axis of rotation) will result in measurable induced currents. In the absence of vibratory activity there will therefore not be a measurable signal.

The instantaneous voltage U1 measured at the terminals of the electrical conductor 4 while a segment AB is present in the field of influence of the magnet 3 is expressed in the following form:

$$U_1 = \int_A^B \vec{E}_m \cdot \vec{dl} = \int_A^B V_{VIBz}B_{x'} \vec{e}_{y'} \cdot \vec{dl} = V_{VIBz}B_{x'}l_{AB}$$

where $l_{AB}$ designates the length of the segment AB subject to the influence of the magnet 3, $B_{x'}$ is the radial component of the magnetic field generated by the magnet 3, and Vvibz' is the vibratory speed component of the magnet 3 along the axis z'.

Electromagnetic Action of the Magnet 3 when it is Facing the Turn Opening

When the magnet 3 is facing the turn opening 46 the electrical conductor 4 escapes the influence of the magnetic field B of the magnet 3; however, the central part 70 of the second electrical conductor 7 enters into this magnetic field B and generates the voltage U2, which is expressed according to the following formula:

$$U_2 = \int_C^D \vec{E}_m \cdot \vec{dl} = \int_C^D V_{rot}B_{x'} \vec{e}_{x'} \cdot \vec{dl} = V_{rot}B_{x'}l_{CD}$$

where $l_{CD}$ designates the length of the segment of the central part 70 subjected to the influence of the magnet, $B_{x'}$ designates the radial component of the magnetic field generated by the magnet 3, and $V_{rot}$ is the speed of rotation of the magnet 3.

Determination of the Speed of Rotation of the Vane

The movement responsible for generation of the voltage U2 in the corresponding electrical conductor 7 is the rotation of the impeller 2 about its axis.

The speed of rotation $V_{rot}$ of the magnet 3 integral with the tip 21 of the vane 20 can be determined during step 104 by the measuring device 6 by carrying out continuously, during a predetermined period, the acquisition of a voltage time signal U2 at the terminals of the second conductor, said signal including a plurality of voltage peaks, each voltage peak corresponding to passage of the magnet facing the turn opening 46 during a respective rotation of the vane.

The duration elapsed between the instants of acquisition of two successive peaks thus represents the duration of a rotation of the vane; the speed of rotation of the magnet 3 can then be calculated by the device 6 based on the duration elapsed between the two peaks (or an average of such durations), and based on the radial position OO' of the magnet 3 around the axis of rotation of the impeller (illustrated in FIG. 4).

Calculation of the Axial Vibratory Speed of the Vane

By combining the relations defined previously for the electrical voltages U1 and U2, the following relation is obtained:

$$\frac{U_1}{U_2} = \frac{V_{VIBz'}B_{x'}l_{AB}}{V_{rot}B_{x'}l_{CD}}$$

If the magnetic field generated by the magnet is isotropic about its axis, then the lengths of the turns under the influence of the magnet are equal ($l_{AB} = l_{CD}$). The following relation is then obtained:

$$\frac{U_1}{U_2} = \frac{V_{VIBz'}}{V_{rot}}$$

During step 104, the axial component of the vibratory speed sustained by the magnet 3 (and therefore the vane 20) is calculated according to the following formula combining the relations defining the voltages U1 and U2:

$$V_{VIBz'} = V_{rot} \cdot \frac{U_1}{U_2}$$

This equation advantageously makes it possible to dispense with any measurement of the magnetic field in one or the other of the electrical conductors 4 and 7 (these quantities being eliminated in the equation above).

Moreover, this additional method makes it possible to obtain quantitative, and not just qualitative, information relative to the vibrations of the vane.

More precisely, it is then possible to associate levels of vibratory speeds with resonant frequencies revealed on Campbell diagrams developed from voltage signals measured at the terminals of the first electrical conductor, without having to measure the amplitude of the magnetic field at a turn.

When the vane is excited by an engine order (n×the speed of rotation, with n an integer) the voltage U1 increases. The proposed assembly makes it possible to transform the voltage information into vibratory speed when the vane is excited.

Materials

Each central part 40, 70 of the electrical conductors can be positioned directly on the internal surface 10 of the casing 1, facing the impeller 2.

As a variant, each central part 40, 70 of the conductor can be positioned inside the casing 1, but ensuring that any portion of material of the casing 1 located between each central part 40, 70 and the magnet 3 promotes good transmission of the magnetic field generated by the magnet 3 to the central part 40, 70. It could be ensured that said portion of material is made of paramagnetic and diamagnetic material, as these materials in fact have magnetic permeability values close to 1. So since the magnetic flow of the magnet 3 would be slightly modified, the whole magnetic flow generated by the magnet 3 could therefore be exploited in the measurements taken.

Each electrical conductor 4, 7 is for example embedded all or part in an abradable deposit located on the internal surface 10 of the casing 1 facing the impeller 2, the abradable deposit being made of such paramagnetic or diamagnetic material.

The magnet 3 can further comprise aluminium-nickel-cobalt (AlNiCo) with a Curie point between 800° C. and 850° C. (the Curie point being the temperature at which the material loses its spontaneous magnetization).

The amplifier 5 can be an amplifier of constant current type, advantageously applying gains of up to 3000. It is possible to boost the voltage at the terminals of the electrical conductor 4 to produce measurable voltage of the order of a millivolt.

The assembly E for turbine engine described can be applied to any type of blades rotatably movable in a fixed structure similar to a casing: axial wheels, centrifugal impellers, high-pressure turbines, free turbines, etc.

A turbine engine comprising such an assembly E can also be embedded in any type of vehicle, especially an aircraft.

The invention claimed is:

1. An assembly for a turbine engine, the assembly comprising:
    a casing and an impeller rotatably movable in the casing, the impeller including at least one vane including a tip facing the casing,
    wherein the tip includes a magnet and the casing includes a first electrical conductor and a second electrical conductor, each electrical conductor being configured to generate between terminals thereof an electrical voltage induced by the magnet of the facing tip representative of vibrations sustained by the tip of the vane when the impeller is set in rotation,
    the first electrical conductor comprising a first central part extending around an axis of rotation of the impeller and including two facing ends, and the second electrical conductor comprising a second central part passing through a space left by the first central part between the two facing ends of the first central part.

2. The assembly according to claim 1, wherein the first central part extends in a path plane of the magnet around the axis of rotation of the impeller, and the second central part extends orthogonally to the path plane.

3. The assembly according to claim 2, wherein the first central part forms a portion of a circle centered on a point of the axis of rotation of the impeller, and the second central part passes through the path plane in one point of the circle.

4. The assembly according to claim 2, wherein the magnet is configured to emit a magnetic field along a radial axis with respect to the axis of rotation of the impeller, the magnetic field generated being isotropic around the radial axis.

5. The assembly according to claim 1, further comprising a voltage amplifier connected to the terminals of each electrical conductor.

6. The assembly according to claim 1, wherein the two electrical conductors are embedded at least partially in an abradable deposit located on an internal surface of the casing facing the impeller, the abradable deposit being made of paramagnetic or diamagnetic material.

7. A method for measuring vibrations of a vane of an assembly for a turbine engine according to claim 1, comprising:
    setting in rotation the impeller inside the casing;
    measuring at the terminals of each of the electrical conductors a respective electrical voltage induced by the magnet contained in the tip of the vane facing the casing;
    determining speed of the magnet;
    calculating an axial vibration speed sustained by the tip of the vane based on the measured electrical voltages and the determined speed of the magnet.

8. The method for measuring according to claim 7, wherein the determining the speed of the magnet comprises:
    acquiring a voltage time signal at the terminals of the second electrical conductor, the signal having at least two successive peaks, facing the second electrical conductor during a respective rotation of the tip around the axis of rotation of the impeller, and
    calculating the speed of the magnet based on radial position of the magnet with respect to the axis of rotation of the impeller and a duration elapsed between the peaks.

9. The method for measuring according to claim 7, wherein the vibration speed is calculated by multiplying the speed of the magnet determined with the ratio of the voltage measured at the terminals of the first electrical conductor over the voltage measured at the terminals of the second electrical conductor.

10. The method for measuring according to claim 7, further comprising amplifying at least one of induced electrical voltages, performed before the measuring.

11. The assembly according to claim 1, wherein the first electrical conductor includes two branches, each branch extending radially from each facing end of the first central part, and each branch forming an angle between 80 degrees and 100 degrees with the first central part.

* * * * *